United States Patent [19]
Anderson

[11] 3,848,904
[45] Nov. 19, 1974

[54] PIPE HAVING COUPLING MEANS
[75] Inventor: Richard H. Anderson, Dover, Ohio
[73] Assignee: Clow Corporation, Oak Brook, Ill.
[22] Filed: Jan. 22, 1973
[21] Appl. No.: 325,952

[52] U.S. Cl........... 285/230, 285/291, 285/DIG. 16, 285/381
[51] Int. Cl.............................. F16l 49/00
[58] Field of Search.......... 285/291, 230, 231, 374, 285/381, 423, DIG. 16, 288; 277/DIG. 2, DIG. 3

[56] References Cited
UNITED STATES PATENTS

| | | | |
|---|---|---|---|
| 2,722,430 | 11/1955 | Kennison | 277/DIG. 2 |
| 2,986,411 | 5/1961 | Anderson | 285/230 X |
| 3,246,671 | 4/1966 | Stein | 285/291 X |
| 3,544,672 | 12/1970 | Goda et al. | 285/381 X |
| 3,588,150 | 6/1971 | Wold | 285/381 X |
| 3,675,950 | 7/1972 | Beene | 285/45 |

FOREIGN PATENTS OR APPLICATIONS

| | | | |
|---|---|---|---|
| 1,023,729 | 3/1966 | Great Britain | 277/DIG. 2 |
| 667,602 | 7/1963 | Canada | 277/DIG. 3 |
| 1,152,740 | 5/1969 | Great Britain | 285/231 |

Primary Examiner—Dave W. Arola
Attorney, Agent, or Firm—Fitch, Even, Tabin & Luedeka

[57] ABSTRACT

Pipe having coupling elements enable lengths of the pipe to be joined end-to-end without the use of additional components. The pipe design uses a tubular body which may be extruded from clay or the like, to which mating coupling elements are affixed.

10 Claims, 4 Drawing Figures

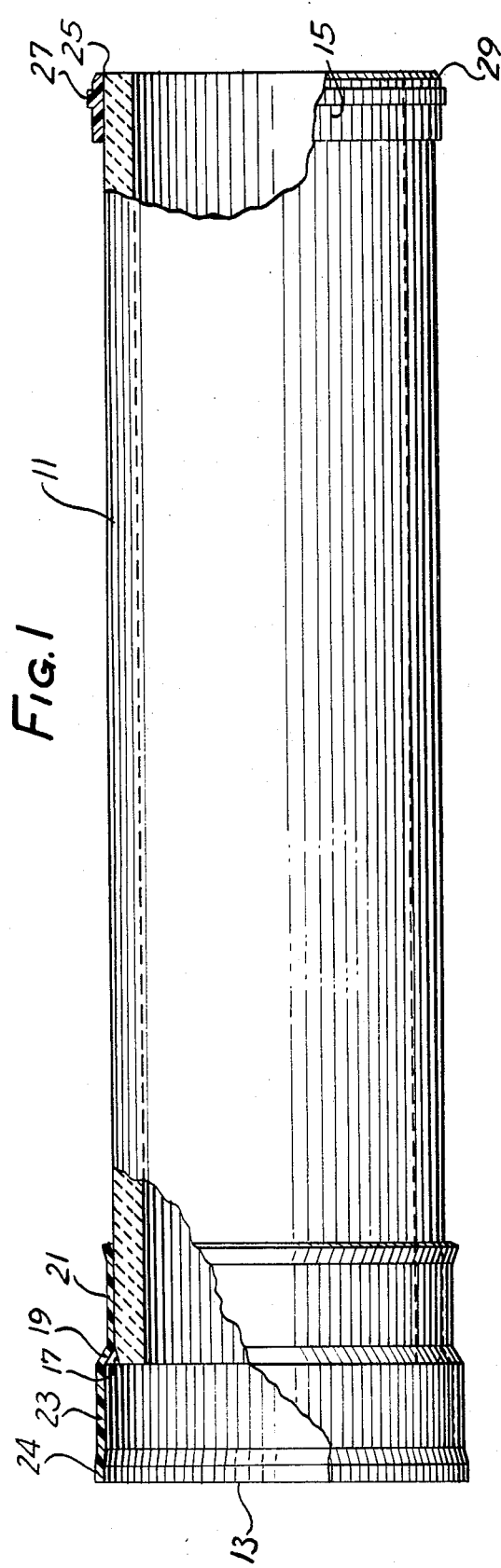
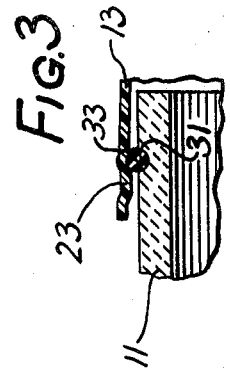
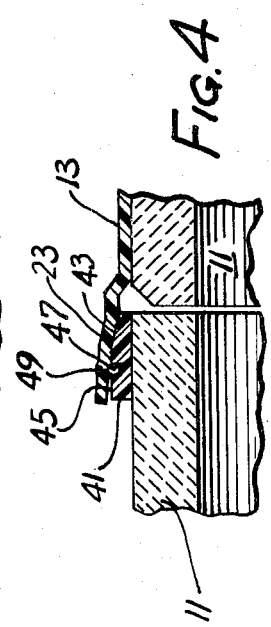
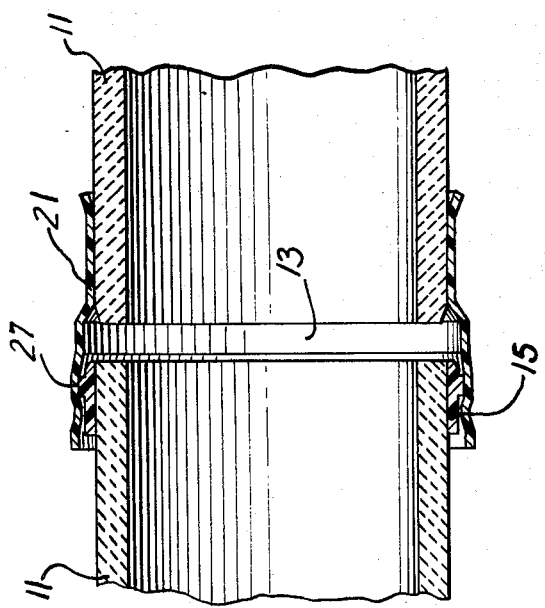

PIPE HAVING COUPLING MEANS

The present invention relates to pipe lengths having coupling means at the ends thereof and more particularly to interconnectable clay pipe which is to be laid under the ground.

Rough piping, such as pipe made out of asbestoscement or clay, is accepted as an economical form of pipe which is to be laid underground to transmit low pressure fluids, such as sewage. This type of pipe is commonly laid in a trench and covered with several feet of earth. The lengths of pipe are joined together to provide a liquid transmitting line by appropriate couplings. One of the more common types of such pipe couplings is the clay bell coupling.

The clay bell coupling is a rigid, integral part of a length of clay pipe, one end of which is formed to have a bell-shaped housing and the other or spigot end of which is formed to be received in such a bell housing. By making the bells from the same material as the pipe itself, this form of pipe can be fairly efficiently produced. However, these bells are easily broken and may result in the failure of the pipeline.

Moreover, as the bells are relatively fragile, breakages may often occur during production of the pipe. Breakage is very common prior to installation of the pipe, as by impact with other pipe lengths during shipping; however, breakage of pipe may also occur after it has been laid under the ground. The pressure of the earth overlaying the pipe is substantial, and this pressure may fracture the clay bell. Obviously, breakage which occurs after the pipe has been laid is quite undesirable for it necessitates excavation and on site replacement.

A further disadvantage of a pipeline coupled together with rigid bells is that the liquid-tight seal between pipe lengths may be loosened by the earth as it settles into the excavation.

It is an object of the present invention to provide improved pipe having coupling means at the ends thereof.

It is another object of the present invention to provide improved clay pipe equipped with coupling means which form an effective, flexible, liquid tight seal between pipe lengths.

These and other objects and advantages of the present invention will be apparent upon reading the following detailed description in conjunction with the accompanying drawings of which:

FIG. 1 is a plan view of a length of pipe having various features of the present invention with portions broken away and shown in section;

FIG. 2 is a cross-section view showing one end of the pipe length of FIG. 1 joined to a similar length of pipe;

FIG. 3 is a fragmentary cross-sectional view similar to FIG. 2 showing the interconnection of pipe lengths having an alternative embodiment of the spigot end; and FIG. 4 is a view similar to FIG. 3 showing another alternative embodiment.

The pipe of the illustrated embodiment generally comprises a uniformly shaped tubular member 11 with a sleeve 13 mounted on the bell end and a collar 15 mounted on the spigot end. The tubular member 11 may be extruded from clay or cast from a similar rigid material, and it is usually of fairly large diameter, typically four or more inches. The tubular member 11 is uniform in wall thickness throughout its length, except for the coupling elements, and thus it can be inexpensively produced by extrusion.

The sleeve 13 is suitably made of elastomeric material and is preferably made from a thermoplastic material which exhibits the characteristic of "thermal memory." The sleeve 13 has two major portions of different diameters interconnected by a web 19. The right hand portion of the sleeve, as viewed in FIG. 1, is termed the pipe mounting portion 21, and it is formed with a diameter that is slightly smaller than the outer diameter of the tubular member 11. The left hand portion of the sleeve is termed the extension or coupling portion 23, and it is formed to have an inside diameter which is greater than the outside diameter of the tubular member 11. The outermost end 24 of the coupling portion 23 is further enlarged to have a slightly greater inner diameter than that of the rest of coupling portion 23.

The sleeve 13 is formed of a thermoplastic material, and if it is made, for example, of polyvinylchloride, it may be rendered thermoplastic by being heated to a temperature between about 200° and 300°F. The outer surface of the end of the tubular member 11 upon which the sleeve 13 will be affixed is preferably previously coated with adhesive that will assure the creation of a good bond. Preferred adhesives are those based upon an epoxy or urethane resin which form good bonds both to thermoplastic materials, such as PVC, and to clay, asbestos-cement and other pipe materials.

The sleeve 13 is conveniently made from an extruded tube of thermoplastic material that is cut to the desired length. The extrusion is formed with an inside diameter about 0.1 inch less than the smallest outside diameter that would be presented by a tubular member 11. The inner diameter of the extrusion upon forming becomes the approximate inner diameter of the pipe mounting portion 21 of the sleeve.

In the usual forming process, the tubular extrusion is cut to the desired length at room temperature, and it is then reheated to a temperature, for example between 200° and 300°F., at which the material is rendered thermoplastic, using a suitable circulating air oven or the like. The hot extrusion section is placed in a suitable press and formed to the desired sleeve profile using suitable male and female dies.

When one is ready to install the sleeves 13, only the pipe mounting portion 21 of the sleeve would be suitably heated to bring its temperature to the thermoplastic range. The sleeve 13 would then be pushed over the tapered end of the tubular member 11 to the position depicted in FIG. 1 and left to cool there. The end portion 21 of the sleeve 13 is forcibly expanded to match the external surface diameter of the tubular portion 11 as a part of the mounting process, and upon cooling, shrinkage occurs as a result of the "thermal memory" of the material causing it to shrink tightly about the tubular member. Particularly if an adhesive sealer is precoated upon the end of the tubular member 11, an excellent leak-proof joint is accomplished between the sleeve 13 and the pipe member 11.

The sealing band is preferably formed by molding a collar 15 in situ on the untapered spigot end 25 of the tubular member 11. The dimensions of the band portion 27 of the collar 15 are selected to provide the spigot end 25 of the pipe with a radial outermost dimension such that the coupling portion 23 of the sleeve 13 is resiliently deformed over a substantial area when the spigot end 25 of another pipe is inserted thereinto. The coupling portion 23 of the elastomeric sleeve 13 and the radial outermost surface of the band 27 accordingly cooperate to form a liquid-tight seal between their contacting surfaces when the two lengths of pipe are joined.

In the preferred method of manufacture, the spigot end 25 of the tubular member 11 is inserted into a mold, and a suitable molding mixture containing a polyurethane prepolymer plus a suitable catalyst is introduced into the mold and allowed to react in situ. The reaction proceeds rapidly, and when the mixture is fully polymerized, the mold is removed leaving a collar 15 of polyurethane, having precise exterior dimensions, is fixedly attached to the spigot end of the tubular member 11. Polyurethane has excellent adhesive properties, and by curing it in situ, an extremely strong bond to the outer surface of the tubular pipe member 11 is accomplished.

The overall dimensions of the sleeve 13 and the collar 15 of course vary with the size of pipe utilized. For the purposes of illustration, a typical four-inch clay pipe having a nominal outer diameter of 5.2 inches might have a taper 17 which is a ⅛-inch drop in a ½ inch run. The sleeve 13 may have a pipe mounting portion having an axial length of 2½ inches and an inside diameter of 5.1 inches. The coupling portion may be 2 inches long and have an inside diameter of, for example, 5.57 inches. The enlarged end entry portion 24 of the coupling portion 23 may be ½ inch long and have an inner diameter of 5.7 inches. The collar 15 may be about 1½ inches long, and its inner diameter would be that of the clay pipe about which it is formed in situ. The wall thickness of the collar 15 at the polyurethane sealing band 27 would be about 5/16 of an inch, and the axial length of the sealing band portion may also be about 5/16 inch. The collar 15 preferably has a one-quarter inch chamfer 29 at its end to aid the initial insertion of the spigot end of a pipe into the enlarged entry end 24 of the extension sleeve 13.

One alternate embodiment is depicted in FIG. 3 wherein the PVC sleeve 13 is formed as previously described and similarly attached to the tubular member 11, but the tubular member 11 is provided with a circumferential groove 31 adjacent spigot end 25. The groove 31 is spaced from the edge of the spigot end 25 about the same distance as was the sealing band portion 27 of the collar. A suitable O-ring 33 is disposed in the circumferential groove 31, and it takes the place of the sealing band. The O-ring 33 should be of sufficient thickness to extend radially from the pipe surface a significant distance. The O-ring 33 is proportioned to fit tightly within the coupling portion 23 of a PVC sleeve and thereby form a liquid-tight seal by resiliently deforming the sleeve as depicted in FIG. 3.

In both embodiments, a narrow pressure region is created which extends circumferentially about the coupling portion 23 where the elastomeric sleeve is resiliently deformed by contact with the sealing band. In the embodiment shown in FIGS. 1 and 2, the axial length of the raised sealing band 27 provides a somewhat wider seal region than the O-ring 33 (FIG. 3); however, both provide narrower and more effective seals than the broad area of joinder that is common when rigid bells are used. Preferably, the axial length of the sealing band should not be greater than about one-half inch long.

Particularly in the embodiment shown in FIG. 3, it may be desirable to coat the outside surface of the tubular member 11, which will be in contact with the mounting portion of the sleeve 13, with an epoxy or urethane adhesive primer just prior to mounting the sleeve thereon. This seals any voids or other nonuniformities which may be present in the outer surface of the tubular member and assures a uniformly tight fit after the thermoplastic material cools and shrinks onto the pipe surface. The outside surface of the tubular member may also be provided with a series of grooves or ridges, if desired, to enhance the rigidity of attachment of the sleeve to the tubular member.

The thermoplastic elastomeric sleeve 13 and collar 15 not only provide an excellent coupling arrangement, but they will cushion a fragile clay pipe member 11 in a manner which minimizes breakage during shipment. Because the material which now forms the coupling portions of the pipe is considerably stronger in tensile and impact strength than clay pipe, breakage resulting from rough handling in installation is significantly reduced. In addition, because the sleeve is flexible, earth loads tend to increase the effectiveness of the seal rather than breaking the seal, as they may do when rigid clay bells are used.

Another alternative embodiment is illustrated in FIG. 4 wherein the sleeve 13 is formed in generally the same manner as hereinbefore described and is similarly attached to the tapered end of the tubular pipe 11. A collar 41 is molded in situ on the nontapered end of the tubular pipe 11, using a polyester or polyurethane resin, in the manner hereinbefore described in respect to the collar 15. The collar 41 is formed with a tapered front edge 43 that leads to a cylindrical surface portion 45. Formed in the cylindrical surface portion 45 is a circumferential groove 47 which is preferably of rectangular cross section, as illustrated, but may have other suitable cross sections. The groove 47 accommodates an O-ring 49 which extends radially outward from the cylindrical surface 45. When two lengths of pipe are joined together, the coupling portion 23 of the sleeve 13 is slightly deformed, and the O-ring 49 is slightly compressed if it is made of an elastomeric material, such as an appropriate synthetic rubber. This cooperative engagement has been found to provide an especially effective seal.

While certain embodiments of the present invention have been shown and described it should be apparent that various modifications may be made therein without departing from the spirit and scope of the invention. Various of the features of the present invention are set forth in the claims which follow.

What is claimed is:

1. A length of pipe adapted to be joined end-to-end to a similar pipe without additional components to form a liquid-tight line, which pipe comprises a generally uniform tubular member, the outside surface adjacent the one end of said tubular member which serves as the spigot end of said pipe having a circumferential sealing band sealingly attached thereto, the radially outermost surface of said band being disposed a predetermined radial distance from the outside surface of said member, the other end of said tubular member having a sleeve of elastomeric thermoplastic material affixed to the outside circumferential surface of said member in liquid-tight relationship thereto as a result of having been heated and then forcibly expanded while hot during mounting upon said member, and a polymeric resin material coating the outer surface of said tubular member in the region of said sleeve, said sleeve having a portion extending a predetermined axial distance beyond the other end of said member which is larger in diameter over its entire length than the remainder of said sleeve, said extension portion having an inner diameter which is slightly smaller than the diameter of said sealing band, and said elastomeric extension portion being resiliently deformed radially outwardly when the band-carrying spigot end of another pipe length is pushed thereinto so that a narrow liquid-tight seal is formed between said band outermost surface and the inner surface of said sleeve extension portion.

2. The pipe of claim 1 wherein said tubular member is formed of clay.

3. The pipe of claim 1 wherein said sleeve is formed of polyvinylchloride.

4. The pipe of claim 3 wherein said tubular member has a circumferential groove adjacent said one end and wherein an O-ring disposed in said groove is adapted to deform said elastomeric polyvinylchloride extension portion.

5. The pipe of claim 2 wherein said band is provided by a collar of polymeric resin which is formed in situ on said tubular member.

6. The pipe of claim 5 wherein said collar is formed of polyurethane resin.

7. The pipe of claim 1 wherein an urethane adhesive bonds the interior surface of said sleeve to the exterior surface of said tubular member.

8. The pipe of claim 2 wherein said band is provided by a collar of polymeric resin formed in situ on said tubular member, which collar has a circumferential groove wherein an O-ring is disposed.

9. The pipe of claim 1 wherein said band is a part of a larger collar of polymeric resin which is formed in situ on said tubular member, the axial length of said band being only a minor portion of the axial length of said sleeve extension.

10. The pipe of claim 9 wherein the axial length of said band is not greater than about one-half inch.

\* \* \* \* \*